Sept. 3, 1968      D. N. TOMA      3,399,693
FLUID DIVERTER CHECK VALVE
Filed June 8, 1966
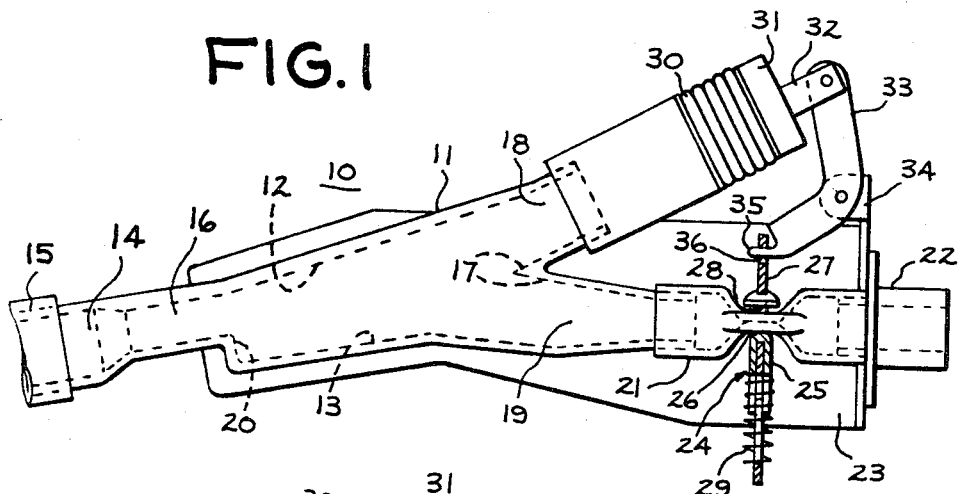
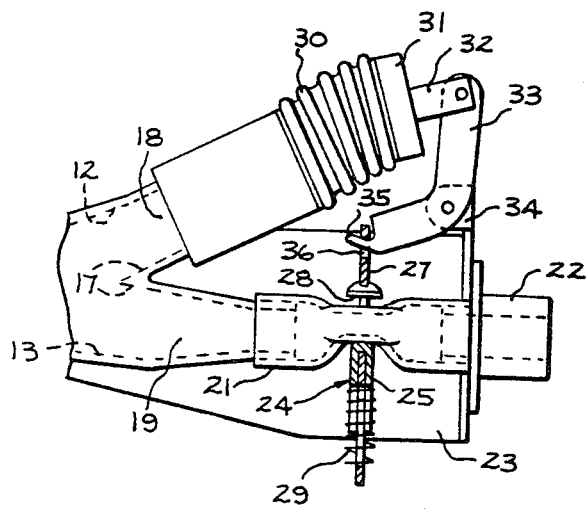
INVENTOR.
DANIEL N. TOMA
BY Radford M. Reams
HIS ATTORNEY

United States Patent Office 3,399,693
Patented Sept. 3, 1968

3,399,693
FLUID DIVERTER CHECK VALVE
Daniel N. Toma, Louisville, Ky., assignor to General
Electric Company, a corporation of New York
Filed June 8, 1966, Ser. No. 556,209
7 Claims. (Cl. 137—494)

This invention relates to check valves and more specifically to a new and improved fluid diverter operated check valve.

Check valves have been used extensively for a long period of time selectively to permit flow in one direction while preventing flow in the other direction. Such valves often are formed as a piece of resilient material which normally closes upon itself or upon a separate member. The resilient material is formed so that fluid flow in one direction opens the resilient material to allow fluid passage while attempted fluid flow in the other direction tends to close the valve. Such valves have several disadvantages. In order for the resilient material to close with surety when desired, the opening provided in the fluid passing direction is necessarily small. Foreign matter in the fluid tends to clog the opening and cause valve failure. After repeated operations the resilient material may tend to lose its resiliency so that the valve will not firmly close, causing undesirable leaks.

The disadvantages of check valves often cause the installation of externally actuated valves, such as solenoid valves, in applications which require only a properly operating check valve. Such valves are somewhat more expensive themselves and unduly complicate the systems in which they are used because they require the generation of a separate signal for their actuator.

It is an object of this invention to provide a new and improved self-operating check valve.

It is another object of this invention to provide such a new and improved valve which normally is positively held in its closed position.

It is a further object of this invention to provide such a new and improved valve which is sensitive to direction of fluid flow to automatically open and allow flow in one direction while preventing flow in the other direction.

In accordance with one form of my invention I provide a valve including a fluid conduit member adapted to be connected to a source of fluid flow. The conduit member includes first and second passages. A flexible tube is connected in fluid flow relationship with the second passage and a pinch mechanism is biased to normally close the tube against fluid flow. A bellows is connected in fluid flow relationship with the first passage and linkage means is provided connecting the bellows to the pinch mechanism to open the tube in response to expansion of the bellows. Further means is provided for directing the fluid flow through the first passage to expand the bellows and thereafter through the second passage.

The subject matter which I regard as my invention is particularly pointed out and distinctly claimed in the concluding portion of this specification. The invention itself, however, both as to its organization and method of operation may best be understood by reference to the following description taken in conjunction with the accompanying drawing.

In the drawing:

FIGURE 1 is a plan view of one form of my new and improved valve, the view being partly broken away and partly in section to illustrate details; and FIGURE 2 is a partial plan view similar to FIGURE 1 but showing the valve in its open position.

Referring now to the drawing, there is shown therein a new and improved check valve generally indicated at 10 which includes a fluid conduit member 11 having spaced elongated side walls 12 and 13. The side walls define an inlet passage 14 adapted to be connected to a source of fluid flow such as a supply pipe 15. Intermediate their ends the side walls 12 and 13 provide a reduced diameter portion 16 which defines a power jet nozzle. A V-shaped, intermediate wall 17 is formed between side walls 12 and 13 at the end opposite inlet passage 14. Side wall 12 and intermediate wall 17 define a first outlet passage 18 while side wall 13 and intermediate wall 17 define a second outlet passage 19, with both of the outlet passages 18 and 19 communicating with inlet passage 14. Just downstream of the reduced diameter portion 16, side wall 13 is offset outwardly as indicated at 20 while side wall 12 forms a smooth, continuous surface. Because of this construction, the Coanda effect will cause fluid flowing through the fluid conduit member initially to flow along side wall 12 and through first outlet passage 18.

A flexible tube 21 is connected at one end in fluid flow relationship to the end of outlet passage 19 and at the other end to a nipple 22 so as to adapt the flexible tube for connection to a desired destination for the fluid flowing through the valve. The nipple 22 is supported on a support member 23 which may also support fluid conduit member 11. For this purpose the fluid conduit member 11, the support member 23 and the nipple 22 might all be molded as a unitary structure.

A closure means such as pinch mechanism 24 is provided for selectively closing tube 21 against fluid flow. The pinch mechanism includes a base member 25 which may be mounted on, or formed as part of, support member 23 and has an edge 26 disposed adjacent flexible tube 21. The pinch mechanism also includes a movable member 27 mounted on base member 25 and having an edge 28 disposed on the opposite side of flexible tube 21. A spring 29 is mounted between the base member 25 and the movable member 27 so as to bias the edge 28 of movable member 27 toward the edge 26 of base member 25. This construction is such that pinch mechanism 24 positively closes flexible tube 21 against fluid flow in either direction.

A bellows 30 is mounted in fluid flow relationship with the end of outlet passage 18 so that fluid flowing through outlet passage 18 will enter the bellows 30. The bellows is closed at its outer end by a rigid member 31 so that the fluid entering the bellows will cause the bellows to expand. A rod 32 extends from the rigid member 31 and connects it to one end of a linkage 33 which is pivoted at its mid-point on a tang 34 provided on support member 23. The other end of linkage 33 is provided with a tab 35 which fits in a slot 36 formed in the end of movable member 27. With this construction, expansion of bellows 30 will cause the linkage 33 to be pivoted about its midpoint so that tab 35 moves member 27 away from base member 25 so as to open flexible tube 21 to fluid flow. This open condition is shown in FIGURE 2.

While a multi-convolution bellows 30 has been shown, it will be understood that all that is required is a fluid responsive means which will move properly upon the introduction of fluid therein. For instance, a single convolution bellows (usually called a diaphragm) or a cylinder and piston could be used.

Assuming there is no fluid flow into valve 10 through inlet passage 14, the valve will assume the position shown in FIGURE 1 with pinch mechanism 24 positively closing flexible tube 21 against fluid flow and bellows 30 occupying its retracted position. When fluid begins to flow through the valve the Coanda effect will cause the fluid first to flow along side wall 12 and first outlet passage 18 so that it enters and expands bellows 30. This pivots linkage 33 about its midpoint so as to move pinch mechanism 24 to its position in which flexible tube 21 is open to fluid flow. When bellows 30 has become completely expanded the outlet passage 18 will be filled with a body of fluid. This causes the fluid flow then to be diverted and flow through outlet passage 19, flexible tube 21 and nipple 22 to whatever destination is desired. When fluid flow into the valve stops the pressure holding bellows 30 expanded and pinch mechanism 24 in its open position against the biasing forces spring 29 will disappear. Then spring 29 will return the pinch mechanism 24 to the position shown in FIGURE 1 so as to positively close flexible tube 21 against fluid passage and contract bellows 30. This closing action may be assisted by forming bellows 30 from a resilient material which tends to assume the contracted position shown in FIGURE 1. It will be seen that pinch mechanism 24 positively prevents fluid flow through the valve from nipple 22 toward inlet 14 since such a flow will not expand bellows 30.

From the foregoing it will be seen that I have provided a new and improved check valve which is sensitive to the direction of fluid flow so as to be self-operating automatically to allow fluid flow in one direction while preventing fluid from flowing in the other direction. The use of the flexible tube and pinch mechanism further provides a structure which is positively closed against unwanted fluid flow and may easily be made sufficiently large to pass foreign objects without danger of the valve clogging.

The foregoing is a description of an illustrative embodiment of the invention and it is my intention in the appended claims to cover all forms which fall within the scope of the invention.

What I claim as new and desire to secure by Letters Patent of the United States is:

1. A valve including:
   (a) a fluid conduit member adapted to be connected to a source of fluid flow, said conduit member including, a first passage and a second passage;
   (b) a tube connected in fluid flow relationship with said second passage;
   (c) closure means biased normally to close said tube against fluid flow;
   (d) fluid responsive means connected in fluid flow relationship with said first passage and adapted to move in response to introduction of fluid therein;
   (e) linkage means connecting said fluid responsive means and said closure means to open said tube to fluid flow in response to movement of said fluid responsive means;
   (f) and means for directing fluid flow through said first passage to move said fluid responsive means and thereafter through said second passage and said tube.

2. A valve as set forth in claim 1 wherein said tube is flexible and said closure means is a pinch mechanism biased normally to close said tube against fluid flow.

3. A valve as set forth in claim 1 wherein said fluid responsive means is a bellows adapted to expand in response to introduction of fluid therein.

4. A valve including:
   (a) a fluid conduit member adapted to be connected to a source of fluid flow, said conduit member including, a first passage and a second passage;
   (b) a flexible tube connected in fluid flow relationship with said second passage;
   (c) a pinch mechanism including a base member disposed adjacent said tube, a movable member disposed on the opposite side of said tube from said base member, and spring biasing said movable member toward said base member to close said tube against fluid flow;
   (d) fluid responsive means connected in fluid flow relationship with said first passage and adapted to move in response to introduction of fluid therein;
   (e) linkage means connecting said fluid responsive means and said movable member to move said movable member away from said base member and open said tube in response to movement of said fluid responsive means;
   (f) and means for directing fluid flow through said first passage to expand said bellows and thereafter through said second passage and said tube.

5. A valve including:
   (a) a fluid conduit member including a pair of elongated side walls and an intermediate wall between said side walls, said side wall forming an inlet adapted to be connected to a source of fluid flow, said first side wall and said intermediate wall forming a first passage and said second side wall and said intermediate wall forming a second passage;
   (b) a tube connected in fluid flow relationship with said second passage;
   (c) closure means biased normally to close said tube against fluid flow;
   (d) fluid responsive means connected in fluid flow relationship with said first passage and adapted to move in response to introduction of fluid therein;
   (e) linkage means connecting said fluid responsive means and said closure means to open said tube to fluid flow in response to movement of said fluid responsive means;
   (f) said first side wall forming a smooth, continuous surface and said second side wall being offset between said inlet and said intermediate wall so that fluid flow will be through said first passage to expand said bellows and thereafter through said second passage and said tube.

6. A valve as set forth in claim 4 wherein said tube is flexible and said closure means is a pinch mechanism biased normally to close said tube against fluid flow.

7. A valve including:
   (a) a fluid conduit member including a pair of elongated side walls and an intermediate wall between said side walls, said side wall forming an inlet adapted to be connected to a source of fluid flow, said first side wall and said intermediate wall forming a first passage and said second side wall and said intermediate wall forming a second passage;
   (b) a flexible tube connected in fluid flow relationship with said second passage;
   (c) a pinch mechanism including a base member disposed adjacent said tube, a movable member disposed on the opposite side of said tube from said base member, and spring biasing said movable member toward said base member to close said tube against fluid flow;
   (d) a bellows connected in fluid flow relationship with said first passage;
   (e) linkage means connecting said bellows and said movable member to move said movable member away from said base member and open said tube in response to expansion of said bellows;
   (f) said first side wall forming a smooth, continuous surface and said second side wall being offset between said inlet and said intermediate wall so that fluid flow will be through said first passage to expand said bellows and thereafter through said second passage and said tube.

References Cited

UNITED STATES PATENTS

| | | | |
|---|---|---|---|
| 2,183,835 | 12/1939 | Foulke | 251—5 |
| 2,890,855 | 6/1959 | Little | 251—5 |
| 2,988,103 | 6/1961 | Canvasser | 137—494 |

M. CARY NELSON, *Primary Examiner.*

ROBERT J. MILLER, *Assistant Examiner.*